United States Patent [19]

Pavincic

[11] 4,434,751
[45] Mar. 6, 1984

[54] ROTARY PISTON ENGINE

[76] Inventor: Ivan Pavincic, 28 Glenn Ct., East Rutherford, N.J. 07073

[21] Appl. No.: 333,801

[22] Filed: Dec. 23, 1981

[51] Int. Cl.³ ............................................... F02B 57/06
[52] U.S. Cl. .................................... 123/43 B; 418/34; 418/37; 418/143
[58] Field of Search ................ 123/43 B, 245; 418/34, 418/37, 142, 143

[56] References Cited

U.S. PATENT DOCUMENTS

| | | | |
|---|---|---|---|
| 605,906 | 6/1898 | Parsons | 418/37 |
| 1,034,451 | 8/1912 | Hendricks | 123/43 B |
| 1,095,730 | 5/1914 | Jacklin | 418/37 X |
| 1,248,441 | 12/1917 | Baudot | 123/43 B |
| 1,591,467 | 7/1926 | Carlson | 123/245 X |
| 1,596,375 | 8/1926 | Riesenecker | 418/34 X |
| 3,196,856 | 7/1965 | Ward | 418/143 X |
| 3,645,239 | 2/1972 | Cena | 123/245 |
| 3,658,447 | 4/1972 | Bancroft | 418/37 X |
| 3,685,928 | 8/1972 | Munzinger | 418/37 X |
| 3,776,202 | 12/1973 | Mesa | 418/36 |

FOREIGN PATENT DOCUMENTS

| | | | |
|---|---|---|---|
| 615112 | 10/1926 | France | 123/43 B |
| 856632 | 3/1940 | France | 123/43 B |

Primary Examiner—Michael Koczo

[57] ABSTRACT

The rotary piston engine has a rotatable annular cylinder and rotatable piston elements interconnected through a cross-linkage mechanism eccentrically arranged relative to the longitudinal axis of the annular cylinder for causing relative oscillatory motion between the piston elements and the annular cylinder. The cross-linkage mechanism has cross arms coupled through a cross connecting arm to the eccentric shaft such that the cross arms do not cross over in each revolution of the annular cylinder.

10 Claims, 13 Drawing Figures

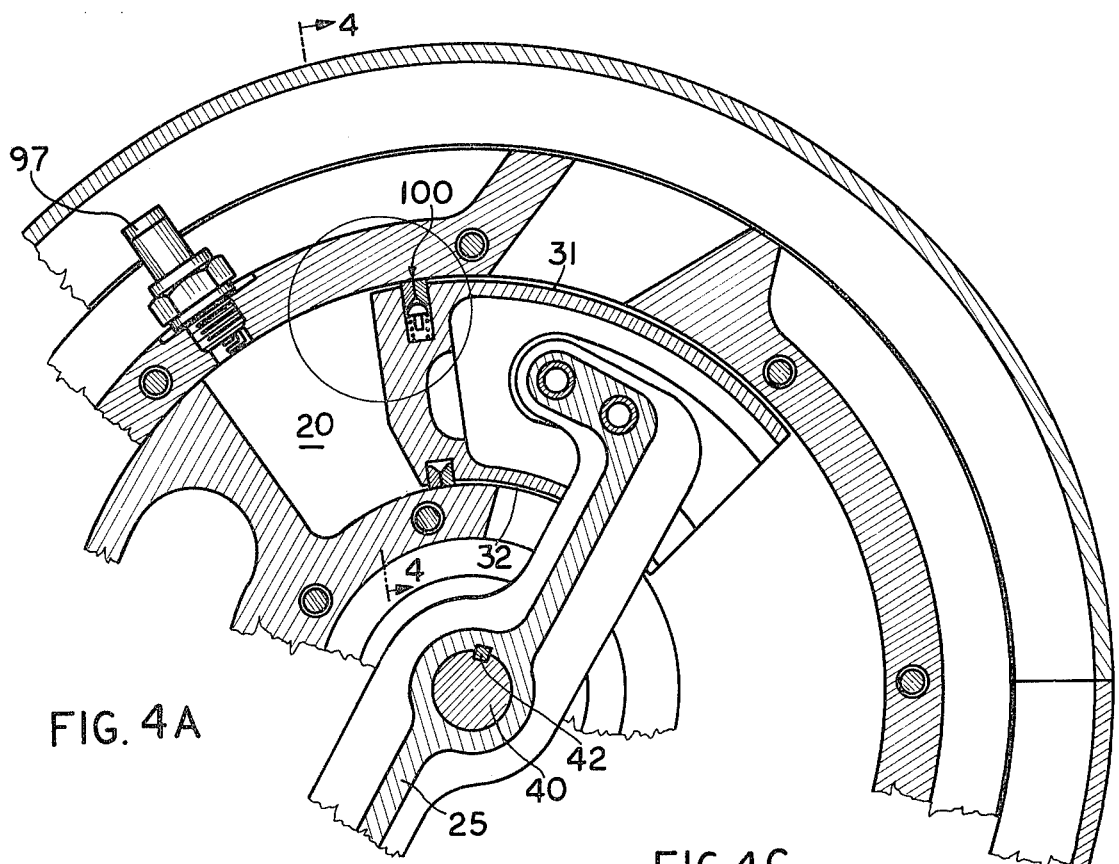
FIG. 4A
FIG. 4C
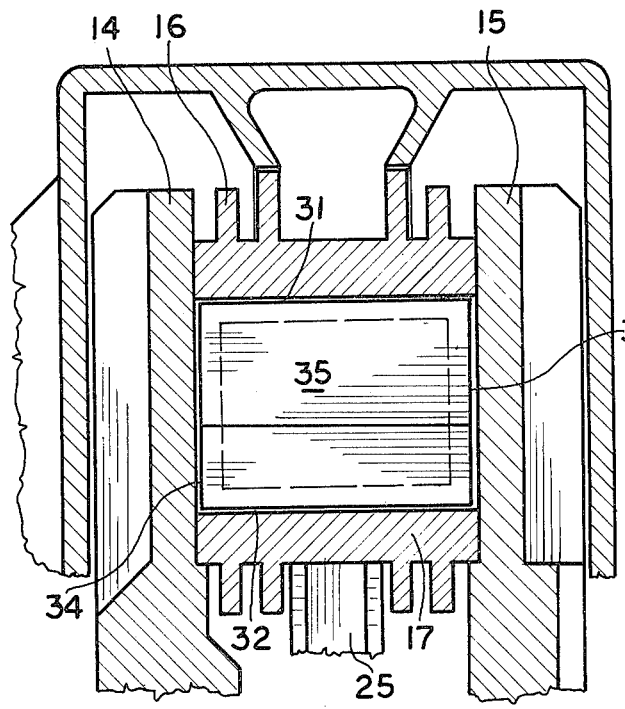
FIG. 4B
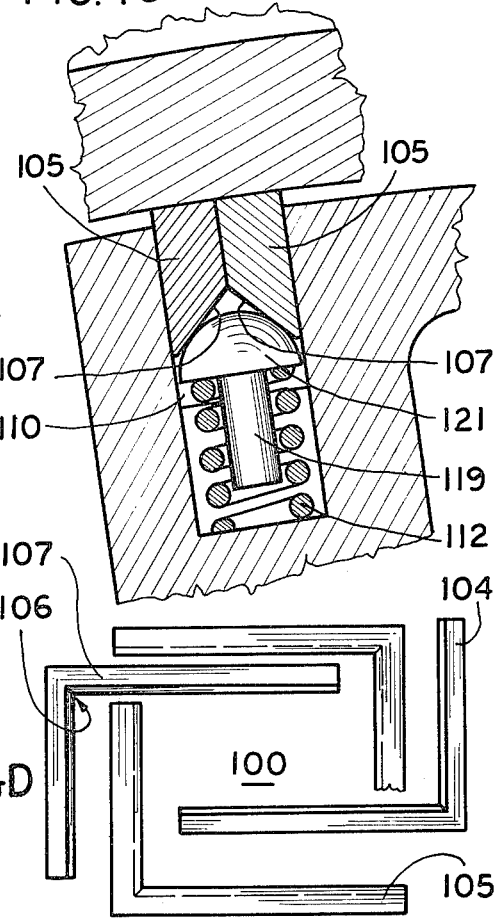
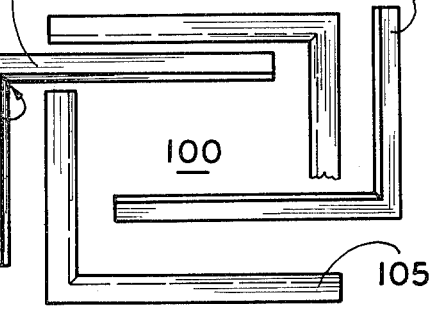
FIG. 4D

ROTARY PISTON ENGINE

This invention relates to rotary piston engines and more particularly to a rotary piston engine design of the type having a rotating annular cylinder and rotating piston elements.

The rotary piston engine of the present invention comprises a rotatable annular cylinder and rotatable piston elements which are interconnected through a cross linkage mechanism eccentrically arranged relative to the longitudinal axis of the annular cylinder for causing relative oscillatory motion between the piston elements and the annular cylinder in a controlled manner. The oscillatory motion between the piston elements and the annular cylinder is limited to an angle of oscillation of less than 180 degrees. This assures a rotational force component between movement of the two dead points of the piston stroke without crossover in the linkage mechanism. The piston elements are accelerated and decelerated by the linkage mechanism without passing through zero velocity. In all conventional internal combustion engine designs the dead point position of the piston stroke is associated with a piston speed of zero velocity. This is a contributory factor to engine vibration and limits the RPM at which the engine can safely operate. Although engine vibration can be minimized it is nevertheless a substantial limiting factor in the design of the engine affecting its longevity and performance.

In accordance with the rotary engine design of the present invention very high RPM may be achieved with minimal engine vibration. This is attributable to the control of the oscillatory motion between the piston elements and annular cylinder provided by the linkage mechanism and good balance of the rotatable elements. The design of the rotatable piston elements of the present invention permits the piston elements to be sealed in a straight forward and simple manner for providing a sealing characteristic equivalent to the sealing characteristic of the conventional linear reciprocating piston engine. Thus, the degree of compression loss or "blowby" from leakage in the compression chamber is minimal.

The piston elements in the rotary engine design of the present invention are arranged for concentric rotation with the annular cylinder about the longitudinal axis of the engine with oscillatory motion caused between the piston elements and the annular cylinder by the interconnecting cross linkage mechanism which is rotatable about a main shaft eccentric to the longitudinal axis of the engine. Each piston element is slidably disposed within a combustion chamber formed in the annular cylinder with a plurality of sealing elements mounted about its circumference for sealing each combustion chamber against leakage.

The rotary engine of the present invention can be operated at substantially higher revolutions per minute with substantially less engine vibration than conventionally designed rotary or reciprocating piston engines thereby providing a higher horsepower output per unit weight. This is attributable to the effective sealing arrangement of the rotatable piston elements and the controlled oscillatory motion between the piston elements and the annular cylinder without crossover of the linkage mechanism.

The rotary piston engine of the present invention can be used as a rotary motor or rotary compressor and may operate in conformity with the Otto cycle or as a diesel engine. The rotary piston engine may be cooled by either water or air.

It is, therefore, the principal object of the present invention to provide a rotary piston engine which can be readily manufactured from existing materials, is easily assembled and maintained.

It is a further object of the present invention to provide a rotary piston engine which will operate economically at much higher revolutions per minute than conventional engines with a higher specific power per unit weight capacity.

Other objects and advantages of the present invention will become apparent from the following detailed description of the invention when read in conjunction with the accompanying drawings of which:

FIG. 4(A) is an exploded view of a portion of FIG. 2 showing the preferred sealing arrangement for each rotary piston element of FIG. 1;

FIG. 4(B) is a view taken along the lines 4—4 in FIG. 4(A) illustrating the spatial relationship of a piston element within a combustion chamber;

FIG. 4(C) is an exploded detail view of the seal formed between the piston element and annual cylinder.

FIG. 4(D) is a view illustrative of the arrangement of the sealing elements about the periphery of a piston element;

DETAILED DESCRIPTION OF PREFERRED EMBODIMENT

Figure 1:
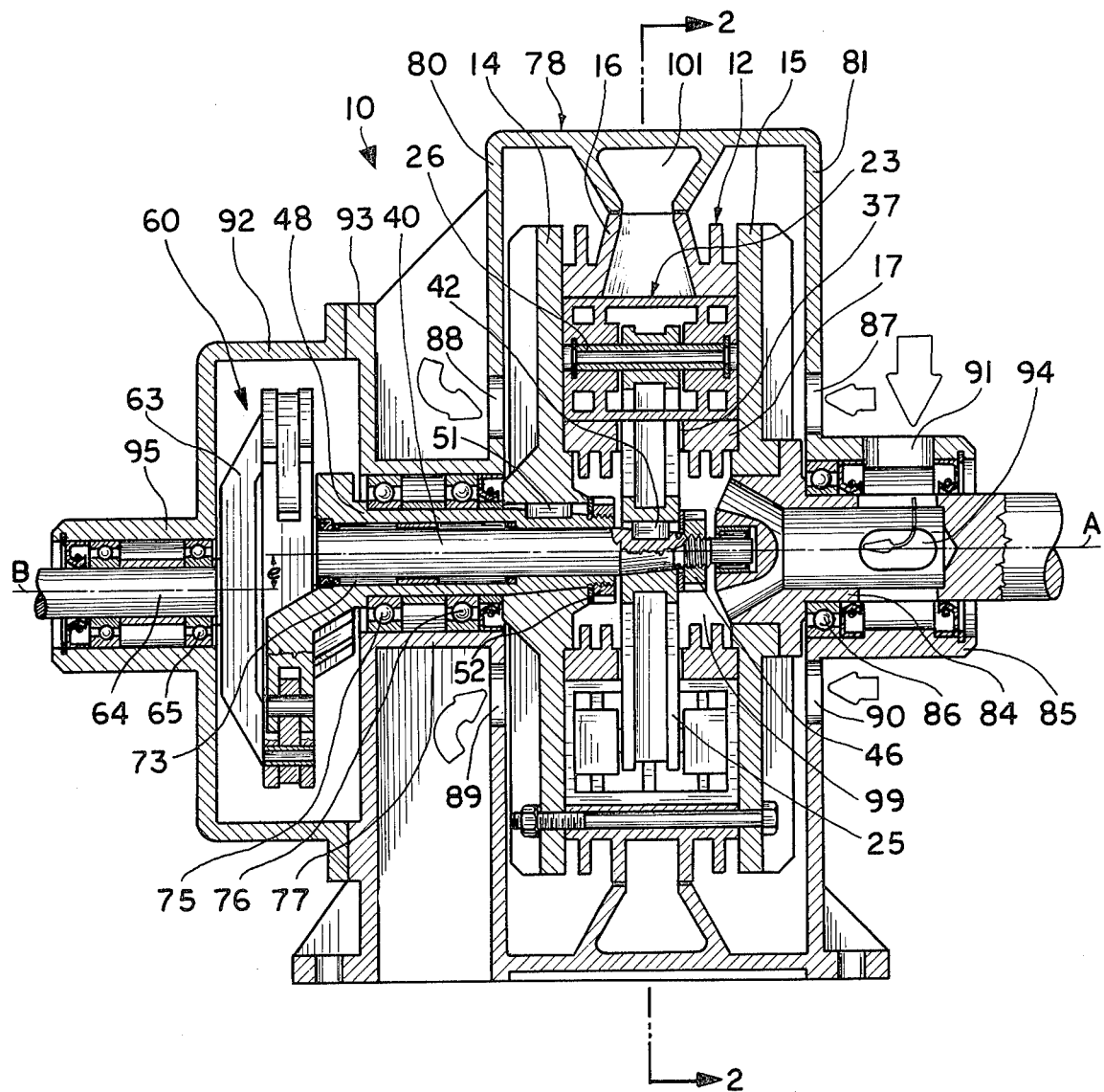
FIG. 1 is a longitudinal cross-sectional view of the rotary engine of the present invention taken along the lines 1—1 of FIG. 2.

The rotary piston engine of the present invention will be hereafter described for purposes of simplicity in connection with its use as a two cycle internal combustion engine although it should be understood that the principles of operation of the present invention are equally applicable to its use with any multiple number of elements or in the design of a diesel engine. In addition, although any type of cooling may be employed the engine is illustrated as an air cooled engine.

Referring now to FIGS. 1, 2, 3, and 4(A)–4(D) inclusive in which the rotary engine 10 of the present invention is shown comprising an annular cylinder 12 composed of side walls 14 and 15 joined through a cylindrical outer ring 16 and a cylindrical inner ring 17. The outer ring 16 and inner ring 17 are coaxially arranged and radially spaced from a central axis A representing the longitudinal axis of the engine. Two wedge shaped segments 18 and 19 (FIG. 2) extend radially from the inner ring 17 to the outer ring 16 in diametrically opposed spacial relationship to form two combustion chambers 20 and 21 between the inner and outer rings 17 and 16 respectively and two suction chambers 117,118. A pair of piston elements 23 and 24 are mounted in the combustion chambers 20 and 21 in sliding engagement with the outer and inner rings 16 and 17 of the annular cylinder 12. The piston elements 23 and 24 are affixed at opposite ends of a connecting rod 25 by means of pins 26. Each combustion chamber 20 and 21 has an intake port 27 and 28 extending through the inner ring 16 and an exhaust port 29 and 30 extending through the the outer ring 16. The inner ring 17 contains machined open sectors 37 to accommodate the connecting rod 25 which is fixed to a rotatable shaft 40 as will be more fully explained hereafter.

The piston elements 23 and 24 have upper and lower surfaces 31 and 32 as shown in FIGS. 4(A) and 4(B) which conform in curvature to the internal surfaces of the outer and inner rings 16 and 17 respectively. The upper surface 31, lower surface 32, and side surfaces 33 and 34 of each of the piston elements 23 and 24 lie in close proximity to the walls of the combustion chambers 20 and 21 respectively. The cross-sectional end face geometry 35 of each of the piston elements 23 and 24 is preferably rectangular in shape. However, it is to be understood that cylindrical piston elements with a circular cross-sectional geometry are within the scope of the invention. A piston element having a curved upper and lower surface and a rectangular cross-sectional end face geometry may readily be machined out of cylindrical stock having a central bore where the outer radius of the cylinder is substantially equal to the radius of the outer ring 16 and where the radius of the central bore is substantially equal to the radius of the inner ring 17.

The connecting rod 25, to which the piston elements 23 and 24 are attached, is fixedly mounted to a rotatable shaft 40 by means of a keyway 42 coupling the connecting rod 25 to a conical end 44 of the rotatable shaft 40. The shaft 40 is laterally held in place by a nut 46 secured to the conical end 44 and abutting the connecting rod 25. Other conventional arrangements for attaching the connecting rod 25 to the rotatable shaft 40 may equally be used such as an arrangement of interlocking spined teeth. The rotating shaft 40 will hereafter be referred to as the "inner" shaft.

A rotatable hollow shaft 48 is coaxially mounted over the inner shaft 40 for concentric rotation therewith about the longitudinal axis A of the engine. The rotatable shaft 48 has a conical end 49 extending through an opening 50 in the side wall 14. The side wall 14 is fixedly mounted upon the conical end 49 of the shaft 48 by means of a keyway arrangement 51 so as to cause common rotation between the annular cylinder 12 and the rotatable shaft 48. The hollow rotatable shaft 48 is laterally held in place by a nut 52 abutting the side wall 14 and threadably engaged to the conical end 49 of the shaft 48. The hollow rotatable shaft 48 will hereafter be referred to as the "outer" shaft.

The piston elements 23 and 24 rotate conjointly with rotation of the inner shaft 40 whereas the annular cylinder 12 rotates conjointly with rotation of the outer shaft 48. Oscillatory reciprocation of annular cylinder 12 relative to the piston elements 23 and 24 is controlled through a cross-linkage mechanism 60 as will be discussed hereafter.

Figure 3:
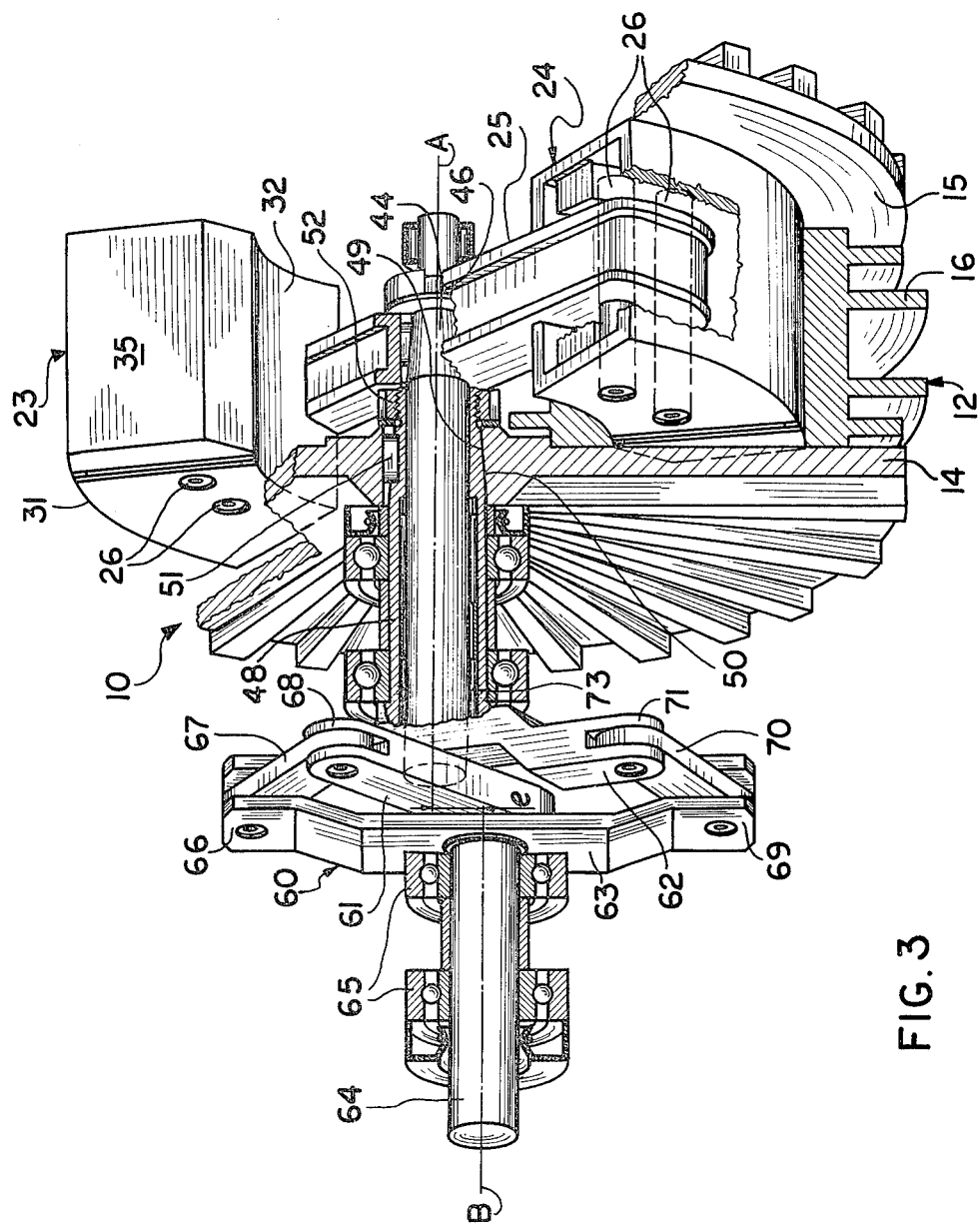
FIG. 3 is a partial perspective view of the rotary piston engine of the present invention illustrating the cross-linkage mechanism with a fragmentary showing of the annular cylinder and piston elements and their interconnection to the cross-linkage mechanism.

The inner shaft 40 is connected to a cross arm 61 as shown in FIGS. 1 and 3 which is disposed transverse to the inner shaft 40 for rotation about the central axis A. The outer shaft 48 is connected to another cross arm 62 disposed transverse to the outer shaft 48 for rotation about the central axis A in a plane of rotation parallel to the plane of rotation of cross arm 61. A cross connecting arm 63 is fixedly mounted to a rotatable main shaft 64 supported in ball bearings 65 for rotation about an axis B in eccentric relationship to the central axis A and separated therefrom by a predetermined distance "e". The cross connecting arm 63 has one end 66 connected through a connecting link 67 to the end 68 of the cross arm 61. The opposite end 69 of the cross connecting arm 63 is connected by a connecting link 70 to the end 71 of cross arm 62. Accordingly, each of the cross arms 61 and 62 have an end 68 and 71 connected through the linking members 67 and 70 to the opposite ends 66 and 69 of the cross connecting arm 63. The unconnected ends of the cross arms 61 and 62 may be free or connected to counterweights for balance. The cross connecting links 67 and 70, cross arms 61 and 62 and the cross connecting arm 63 form the cross linkage mechanism 60 for controlling oscillatory motion between the rotating piston elements 23 and 24 and the rotating annular cylinder 12.

A housing 78 encloses the engine 10 and cross-linkage mechanism 60. The outer shaft 48 is supported for rotation about the inner shaft 40 by needle bearings 73 and for rotation relative to the housing 78 by ball bearings 75 and 76 mounted between the outer shaft 48 and the casing wall 77 of the housing 78. The housing 78 further includes side walls 80 and 81 which encloses the annular cylinder 12 and piston elements 23 and 24. The side wall 15 of the annular cylinder 12 is fixedly secured to a shaft 84 extending in coaxial alignment with the longitudinal axis of the engine. The shaft 84 is journaled in ball bearings 86 mounted between the shaft 84 and a tubular flange 85 extending from the side wall 81 of the housing 78. The shaft 84 may be used to connect the rotary engine 10 to a distributor (not shown). The housing 78 includes a number of openings 87, 88, 89 and 90 to provide ingress of air for cooling the rotary engine 10. A side cover 92 is bolted to a side wall 93 to form an enclosure for the cross linkage mechanism 60. A tubular flange 95 extends from the side cover 92. The main shaft 64 extends through the tubular flange 95 and is rotatably journaled in bearings 65 for rotation about the axis B.

Figure 2:
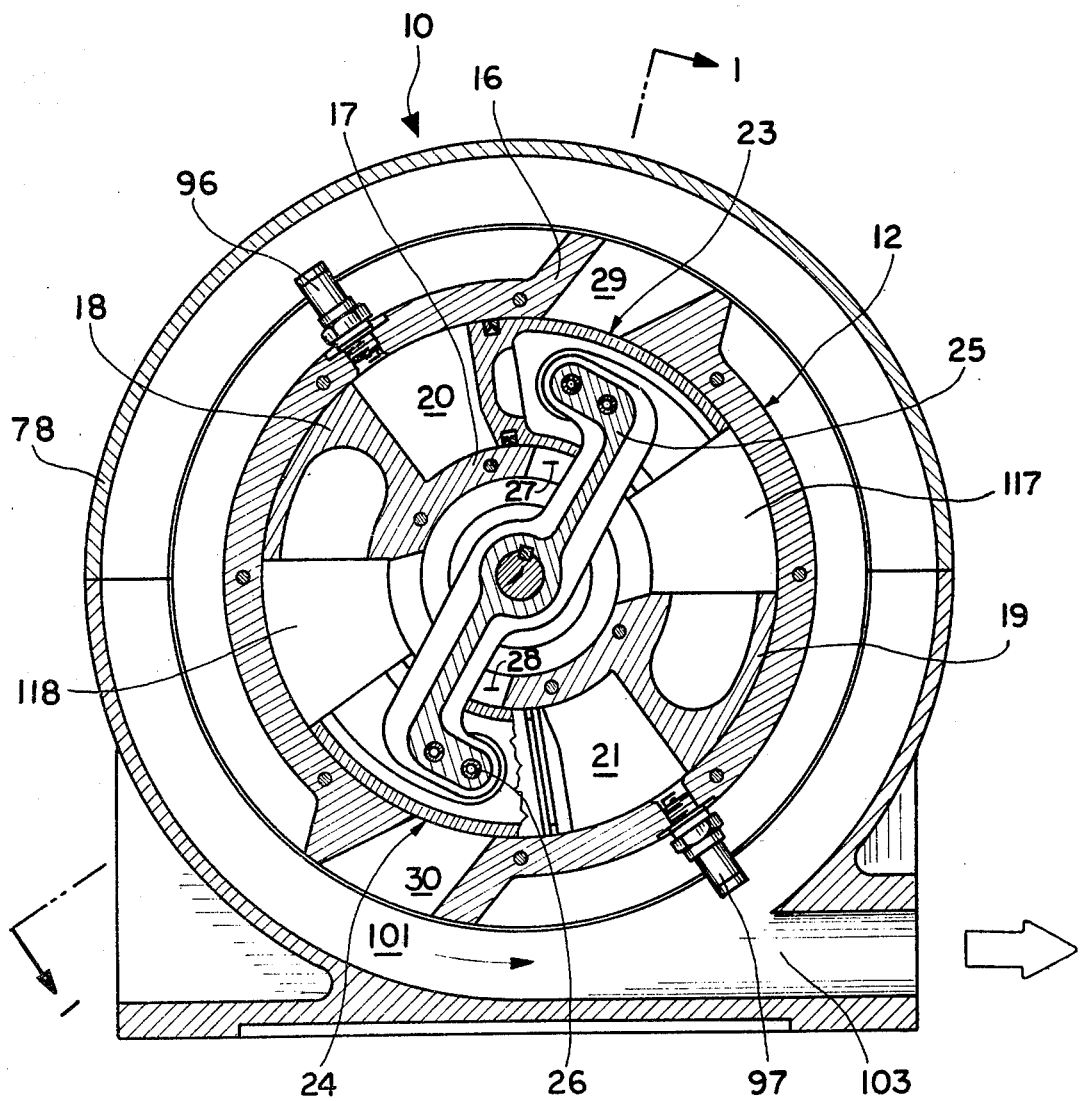
FIG. 2 is a vertical section of the rotary engine of the present invention taken along the lines 2—2 of FIG. 1.

Spark plugs 96, 97 are mounted in the outer ring 16 of the annular cylinder 12 for executing the power stage during operation of the rotary engine 10. The end face 35 of each piston element 23 and 24 may be canted to maximize withdrawal of spent gases during exhaust and preceding intake of an air fuel mixture into each combustion chamber 20 and 21. The air fuel intake mixture is passed from a carburetor (not shown) through openings 91 and 94 entering the suction chambers 117 and 118 through the central interior 99 of the engine 10. Although not shown it is conventional to use a reed valve or rotary valve to prevent back flow of the fuel mixture from the suction chambers. The exhaust is withdrawn through the exhaust ports 29 and 30 into the exhaust manifold 101 of the engine 10 from whence it is exhausted to the atmosphere through the exhaust port 103. The exhaust ports 29 and 30 also provide the additional function of acting as an exhaust jet for providing additional thrust on the rotating annular cylinder 12. The preferred geometry of the exhaust ports 29 and 30 is shown in FIG. 2 with each port having slanted walls which lie at an angle relative to the radius of the annular cylinder 12.

The piston elements 23 and 24 are sealed to prevent loss in compression from leakage around the piston elements 23 and 24 following the compression stroke. As more specifically shown in FIGS. 4(A) through 4(C) a seal is formed between each of the piston elements 23 and 24 and the combustion chambers 20 and 21 by means of a plurality of sealing segments 100 arranged about the periphery of each piston element. Each sealing segment 100 has two arms 104 and 105 of unequal length corresponding to the unequal lengths of the top and side surfaces 31 and 33 of each piston element 23 and 24. The arms 104 and 105 are connected at ninety degrees to one another to form the shape of the capital letter "L" in profile. The ninety degree corner 106 of each of four sealing segments 100 is positioned about a corresponding one of the four corners of a piston element as shown in FIG. 4(D) with two arms of equal length abutting one another on each of the four sides of the piston element. The sealing segments 100 are arranged so that the shorter arms 104 adjoin one another along the side surfaces 33 and 34 and the longer arms 105 adjoin each other along the upper and lower surfaces 31 and 32 respectively. Thus there are two adjoining arms on each of the four surfaces 31, 32, 33 and 34 of each piston element. The arms 104 and 105 of each sealing segment 100 have a beveled surface 107 machined on their inside surface extending preferably over the entire length thereof. When two equal length arms join in abutting relation the beveled surfaces 107 form a complementary "V" shape. Each pair of adjoining arms are mounted over an open channel 110 formed on each side 31, 32, 33 and 34 of each piston element respectively. A compression spring 112 having a pin 119 affixed to one end is mounted in each opening 110 with each pin 119 having a head 121 symmetrically biased against the complementary grooved surfaces 107 between each abutting pair of arms 104, 105 on each side of each piston element so as to urge each sealing segment 100 against the walls of the compression chamber. Accordingly, an equal and symmetrical sealing force is provided around each piston element 23 and 24 to prevent leakage.

Figure 5A:
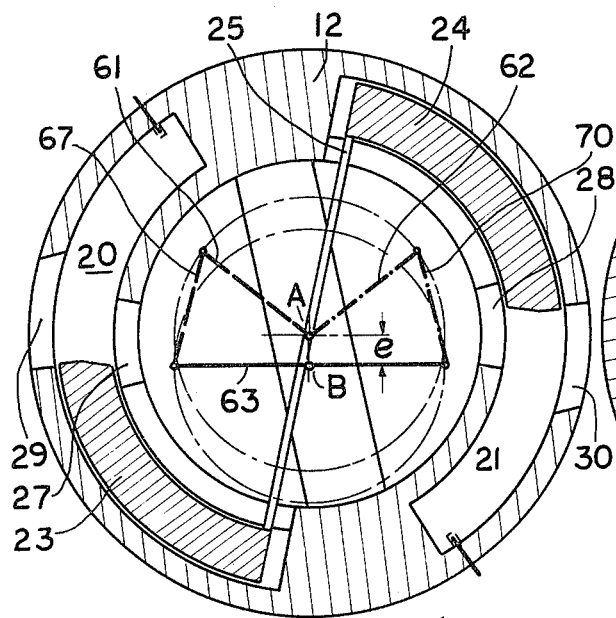
FIGS. 5A, 5B, 5C and 5D show the characteristic stages of the rotary piston engine of the present invention during execution of four stages of the two stroke combustion engine, looking from linkage mechanism side; vis., exhaust, intake, compressions and power (Expansion)
Figure 5B:
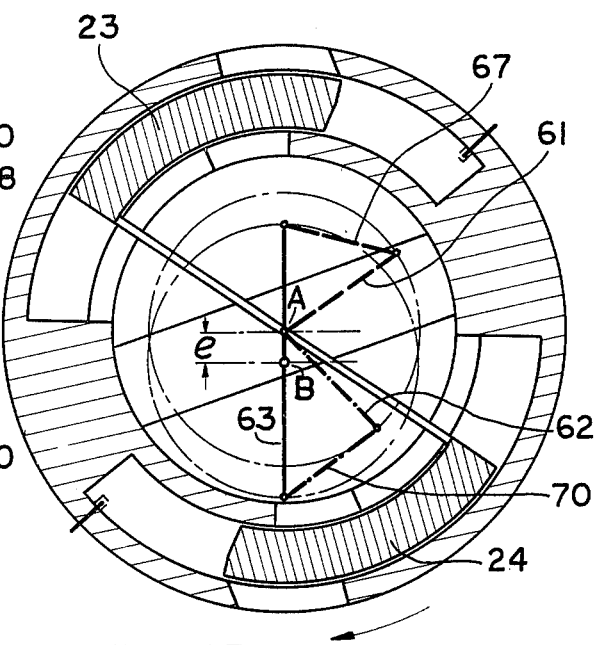
Figure 5C:
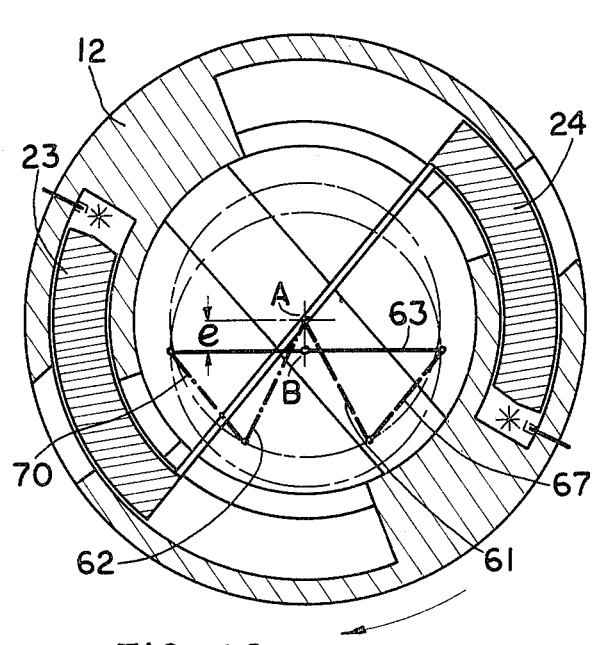
Figure 5D:
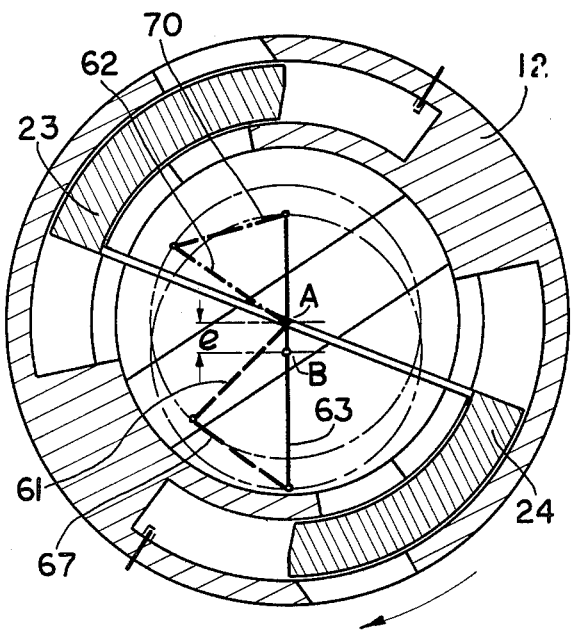

The four stages of the two cycle engine are performed in each of the two combustion chambers 20 and 21 in unison. As exemplified in FIGS. 5A, 5B, 5C, and 5D in conjunction with FIGS. 1 through 4, a mixture of fuel and air is delivered from a carburetor (not shown) through the interior opening 94 of the shaft 84 whereupon it enters the suction chamber 117 and 118 during the intake stroke illustrated in FIG. 5A. The air/fuel mixture compressed by rear side of piston elements 23 and 24 enters simultaneously through each intake port 27 and 28 respectively to combustion chambers 20 and 21. FIG. 5A illustrates that intake occurs after maximum exhaust as is typical of a conventional two cycle engine. Again and in unison the compression stroke occurs in both combustion chambers 20 and 21 as illustrated in FIG. 5B. The moment of maximum compression when ignition occurs is illustrated in FIG. 5C and the expansion stroke is illustrated in FIG. 5D. The exhaust stroke follows with FIG. 5A showing the moment of maximum exhaust and the occurrence of the intake stroke. Oscillatory motion between the annular cylinder 12 and the piston elements 23 and 24 is controlled by the cross-linkage mechanism 60 which intercouples the piston elements 23 and 24 and the concentric inner and outer shafts 40 and 48 respectively. The cross connecting arm 63 is shown as a solid line in each of the diagrammatic views of FIGS. 5A to 5D and FIG. 6 while the cross arm 61 and connecting link 67 are shown as dash lines and the cross arm 62 and connecting link 70 as dot-dash lines. Because of the eccentricity "e" between the central or longitudinal axis A of the rotary engine and the axis B of the main shaft 64, the cross arms 61 and 62 of the cross-linkage mechanism 60 will angularly rotate relative to one another in each cycle of rotation of the annular cylinder 12. The angle displaced between the moving cross arms 61 and 62 is denoted as angle $\alpha$. The angle also represents the angle of oscillation between the annular cylinder 12 and the piston elements 23 and 24 for each cycle of rotation of the engine. In FIG. 5A the cross connecting arm 63 is at maximum displacement relative to the central axis A with the angle of oscillation $\alpha$ at maximum. In FIG. 5B, the compression stroke, the angle of oscillation $\alpha$ is at an angle between its maximum and minimum with the cross connecting arm 63 in a vertically rotated position extending through the central axis A. In this position the displacement between the cross connecting arm 63 and the central axis A is minimum (zero). In FIG. 5C, illustrating the point of maximum compression, the angle of oscillation $\alpha$ is at its minimum and the cross connecting arm 63 is again at a position of maximum displacement relative to the central axis A. In FIG. 5D representing the power stroke (expansion) the angle of oscillation $\alpha$ again lies between its minimum and maximum and the cross connecting arm 63 once again vertically extends through the central axis A with zero displacement between the cross connecting arm and the central axis A.

It should become evident that the angle of oscillation $\alpha$ reaches its maximum and its minimum in each compression chamber 21 and 22 at the same time. The oscillation angle $\alpha$ is designed in this embodiment of the rotary engine to be at maximum during the exhaust and intake strokes and to be at minimum at the moment when the compressed fuel and air mixture is ignited by operation of the spark plugs 96 and 97. The movement between $\alpha$ maximum and $\alpha$ minimum represents the total angular displacement between the respective cross arms 61 and 62 and, in turn, between the piston elements 23, 24 and the annular cylinder 12. The cross arms 61 and 62 move alternately relative to one another between the maximum and minimum included angle of oscillation $\alpha$ for each 180 degrees of rotation of the annular cylinder 12. Accordingly, there is no crossover between the cross arms of the cross-linkage mechanism 60.

Figure 6:
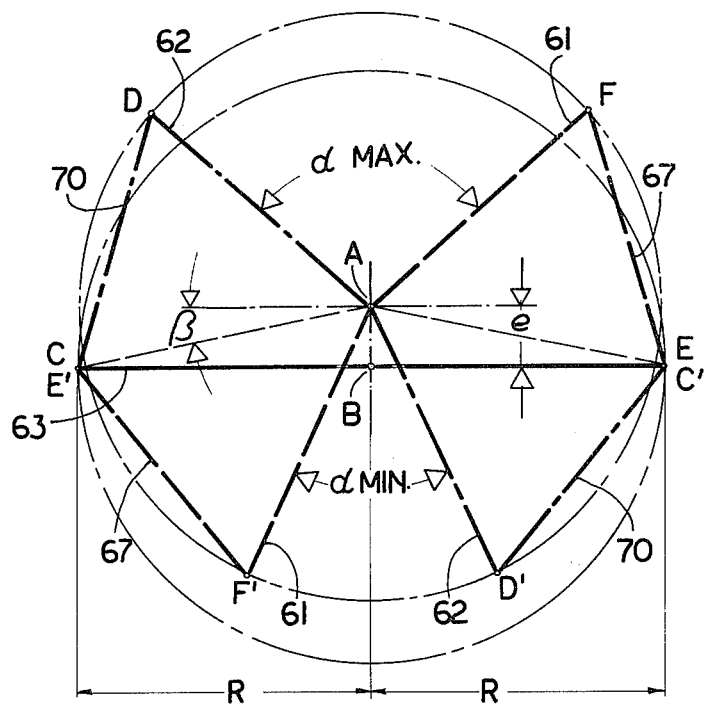
FIG. 6 shows the minimum and maximum included angles between the interconnecting cross arms of the cross-linkage mechanism coupling the annular cylinder to the piston elements.

The oscillation angle $\alpha$ depends upon the length of the cross connecting arm 63 and the eccentricity "e" between the axis B about which the cross connecting arm 63 rotates and the longitudinal axis A of the rotary engine. For every 180 degrees of rotation the angle $\alpha$ varies between its maximum and minimum. The maximum and minimum position of the cross arms 61 and 62 corresponding to the maximum and minimum displacement angles $\alpha$ maximum and $\alpha$ minimum is shown in FIG. 6. FIG. 6 shows the cross arm linkage mechanism positions for both FIGS. 5(A) and 5(C). It should be noted that the cross connecting arm 63 is in the same position relative to the longitudinal axis A at both the maximum and minimum displacement positions. Two symmetrically equal triangles ACD and AEF are formed at α maximum and two other symmetrically equal triangles AE'F' and AC'D' are formed at α minimum. The triangle ACD is the same and is displaced from the triangle AE'F' by 2×angle β or two angle β relative to the longitudinal axes A. The same is true for triangle AEF relative to AC'D'. The total displacement between the cross arms 61 and 62 reflecting the total angular movement between the piston elements 23 and 24 and the annular cylinder 12 is equal to 4×angle or four angles. This can be restated as α is αmaximum−αminimum=4β. The largeness of angle β is calculated from equation tan β=e/R. The rotary engine displacement in accordance with this invention for two pistons in one annular cylinder can be represented by the following equation:

$$V = \frac{n(R_1^2 - r_1^2)\pi \cdot \alpha \cdot w}{360°} = \frac{2(R_1^2 - r_1^2)3.14 \cdot 4\beta \cdot w}{360}$$

$$V = 0.06981(R_1^2 - r_1^2)\beta w = 0.07(R_1^2 - r_1^2)\beta w$$

n number of combustion chambers 20 and 21
$R_1$ is inner radius of outer ring 16
$r_1$ is outer radius of inner ring 17
w is width of inner ring 17 and outer ring 16

Figure 7:
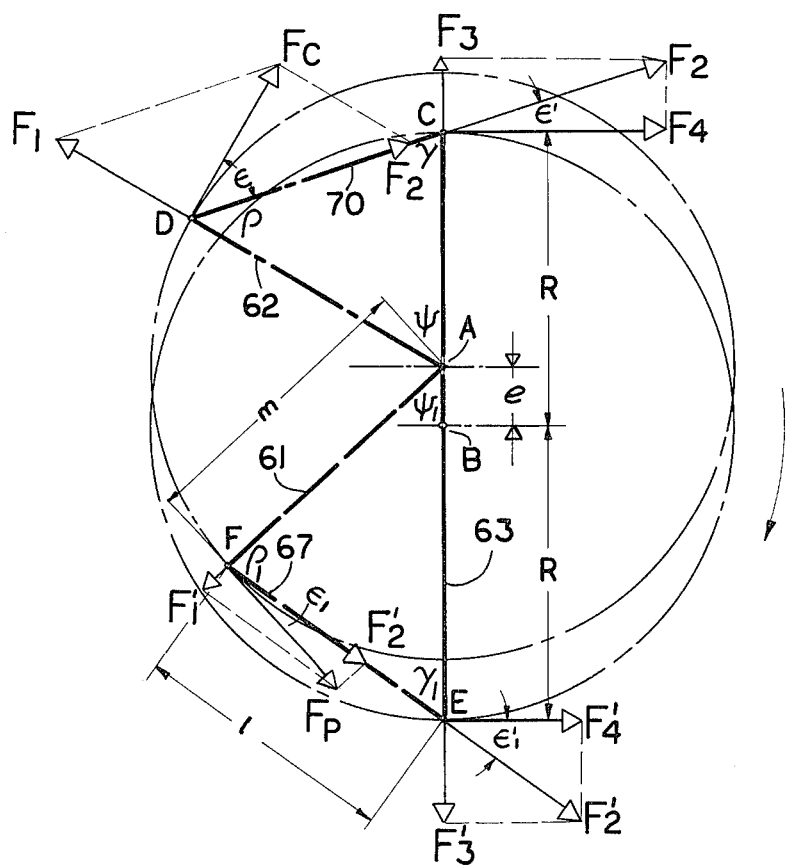
FIG. 7 illustrates the forces generated upon the cross arms of the cross-linkage mechanism.

An important characteristic of the rotary engine of the present invention are the turning forces which rotate the piston elements and annular cylinder in either a clockwise or counterclockwise direction. The direction of rotation is established based on initial movement of the annular cylinder and the timing of the ignition in the combustion chambers. Because of the eccentricity "e" between the axis B of the cross connecting arm 63 and the central axis A, the forces acting on the cross arms 61 and 62 of the linkage mechanism 60 are not constant assuring continuous rotation in the established direction of rotation. An analysis of the forces on the linkage mechanism 60 is indicated in FIG. 7. The piston force is designated Fp and the cylinder force in each chamber is designated Fc. For this rotary engine there are two cylinder and two piston forces having the same intensity but of opposite direction.

The conventional cosine rule for scalene triangle with three known sides a, b and c having an included acute angle between sides b and c is:

$$\cos\alpha' = \frac{b^2 + c^2 - a^2}{2 \cdot b \cdot c}$$

Applying this rule to the triangle ACD (FIG. 7)

$$\cos\rho = \frac{l^2 + m^2 - (R - e)^2}{2 \cdot l \cdot m}$$

The cylinder force at position "D" FIG. 7 can be resolved into force components $F_1$ and $F_2$ with an angle ε between cylinder force Fc and turning component $F_2$. The angle ε=90−ρ
and $$\cos\epsilon = \frac{Fc}{F_2}$$

From this formula turning component force $F_2$ is:

$$F_2 = \frac{Fc}{\cos\epsilon}$$

The cosine rule for opposite angle γ is:

$$\cos\gamma = \frac{(R - e)^2 + l^2 - m^2}{2(R - e) \cdot l}$$

The force $F_2$ at position "C" can be resolved into force components $F_3$ and cylinder turning force component $F_4$ with angle ε' between $F_2$ and $F_4$.

ε'=90−γ
Where $$\cos\epsilon' = \frac{F_4}{F_2}$$

Cylinder force component $F_4$ on cross connecting arm 63 at position "C" is:

$$F_4 = F_2\cos\epsilon' \text{ or } F_4 = Fc\frac{\cos\epsilon'}{\cos\epsilon}$$

Cylinder turning force component $F_4$ is acting in clockwise direction when looking on engine from linkage mechanism 60 FIG. 7.

For opposite triangle AEF where piston force Fp acting counterclockwise at position "F" can be resolved into force components $F_1'$ and $F_2'$ with an angle between Fp and $F_2'$ FIG. 7 Cosine rule for triangle AEF is:

$$\cos\rho_1 = \frac{l^2 + m^2 - (R + e)^2}{2 \cdot l \cdot m}$$

The angle $\epsilon_1$=90−$\rho_1$
and $$\cos\epsilon_1 = \frac{Fp}{F_2}$$

From this formula turning component force $F_2'$ is:

$$F_2 = \frac{Fp}{\cos\epsilon_1}$$

Cosine rule for opposite angle $\gamma_1$ is:

$$\cos\gamma_1 = \frac{(R + e)^2 + l^2 - m^2}{2(R + e) \cdot l}$$

The force $F_2'$ at position "E" can be resolved into force components $F_3'$ and piston turning force component $F_4'$ with angle $\epsilon_1'$ between $F_2'$ and $F_4'$.

$\epsilon_1'$=90−$\gamma_1$

Where $$\cos\epsilon'_1 = \frac{F_4}{F_2}$$

Piston turning force component $F_4'$ on cross connecting arm 63 at position "E" is:

$$F_4 = F_2 \cos\epsilon'_1 \text{ or } F_4 = Fp \frac{\cos\epsilon'_1}{\cos\epsilon_1}$$

Since cylinder turning force component $F_4$ acting at position "C" is bigger than piston turning force component $F_4'$ acting at position "E" the rotary engine according this invention will rotate in clockwise direction FIG. 7. The rotary engine torque is:

$$T = R\, F_4 - R\, F_4'$$

$$T = R(F_4 - F_4')$$

Additional turning force to increase engine output power also comes from the action of the exhaust gases jet due to the inclined nozzle of the exhaust port 29 and 30.

What is claimed is:

1. A rotary piston engine comprising:
   a rotatable annular cylinder coupled to a first shaft for rotation about the longitudinal axis of the engine, said annular cylinder having at least two combustion chambers with inlet and exit ports respectively;
   at least two piston elements, each being slidably mounted in a separate one of said combustion chambers;
   a connecting rod mounted upon a second shaft coaxial to said first shaft for concentric rotation about said longitudinal axis, said connecting rod having opposite ends affixed to each of said piston elements for rotating the piston elements conjointly with rotation of said second shaft;
   a third shaft supported for rotation about a main axis eccentrically displaced a predetermined distance from the longitudinal axis of the engine; and
   linkage means for controlling oscillatory motion between said piston elements and said rotating annular cylinder, said linkage means comprising:
   a cross connecting arm transversely mounted upon said third shaft;
   a first cross arm integral with said first shaft;
   a second cross arm integral with said second shaft, with said first and second cross arms being mounted in common on one side of said cross connecting arm; and
   means for linking one end of said cross connecting arm to said first cross arm and the opposite end of said cross connecting arm to said second cross arms such that said first and second cross arm will angularly rotate relative to one another during each revolution of the annular cylinder with a maximum angular displacement therebetween of less than 180 degrees.

2. A rotary piston engine as defined in claim 1 wherein each exit port in the annular cylinder has slanted walls for providing additional jet exhaust thrust for the engine.

3. A rotary piston engine as defined in claim 1 wherein said annular cylinder comprises a cylindrical outer ring, a coaxially arranged cylindrical inner ring, each of said rings being radially spaced from said longitudinal axis and first and second segments extending radially from the inner to the outer ring in diametrically opposed spacial relationship to form said combustion chambers.

4. A rotary piston engine as defined in claim 3 wherein each piston element has curved upper and lower surfaces conforming to said outer and inner rings respectively and a substantially rectangular cross-sectional end face geometry.

5. A rotary piston engine as defined in claim 4 further comprising a plurality of sealing segments arranged about the periphery of each piston element for forming a seal between each piston element and each combustion chamber respectively.

6. A rotary piston engine as defined in claim 5 wherein each sealing segment has two interconnected arms with each arm having a length corresponding to the cross-sectional length of one of two adjacent sides of a piston element.

7. A rotary piston engine as defined in claim 6 wherein said two interconnected arms of each sealing segment forms an "L" shaped profile.

8. A rotary piston engine as defined in claim 7 wherein adjacent arms of two sealing segments are arranged to abut one another on each side of each piston element respectively.

9. A rotary piston engine as defined in claim 8 wherein each arm of each sealing segment has a beveled surface substantially extending the length thereof which mates with the beveled surface of the abutting arm for forming a complementary "V" shaped surface.

10. A rotary piston engine as defined in claim 9 further comprising an open channel formed about the periphery of each piston element at a location underlying said sealing segments and spring means disposed in said open channel in biased relation against said beveled surface of each sealing segment.

* * * * *